Figure 1:
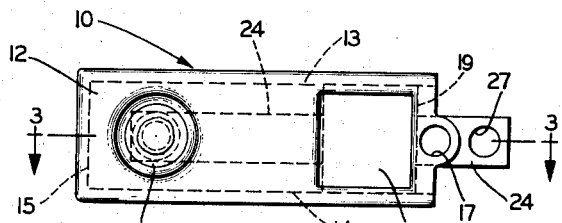

Dec. 14, 1965   G. E. WEHL   3,223,808
PRECALIBRATED THERMOSTATIC SWITCHES
Filed Sept. 25, 1963   2 Sheets-Sheet 1

INVENTOR.
Glenn E. Wehl
BY
Frease, Bishop, Johns & Schick
ATTORNEYS

Dec. 14, 1965 G. E. WEHL 3,223,808
PRECALIBRATED THERMOSTATIC SWITCHES
Filed Sept. 25, 1963 2 Sheets-Sheet 2
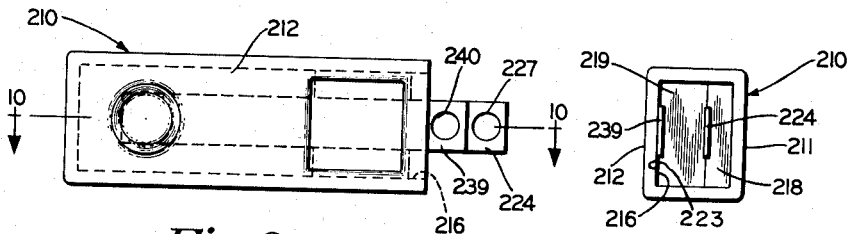
*Fig. 8*
*Fig. 9*
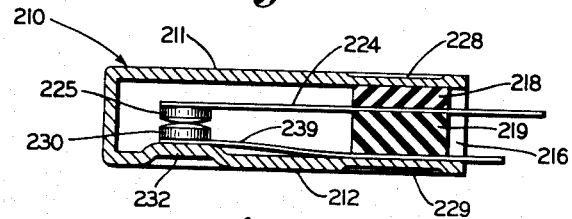
*Fig. 10*
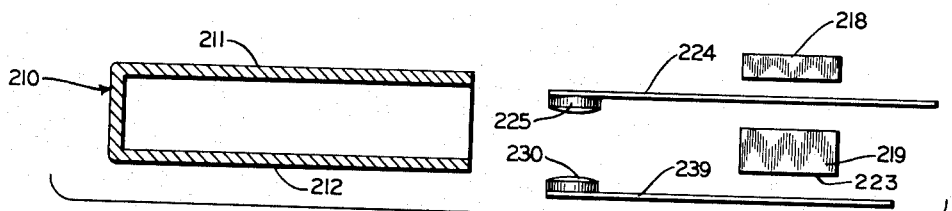
*Fig. 11*
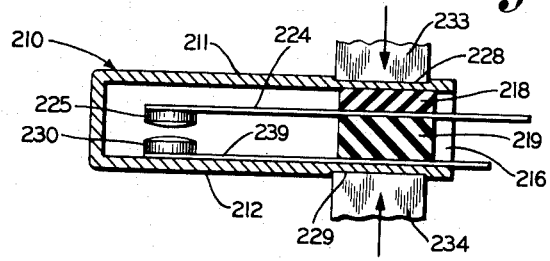
*Fig. 12*
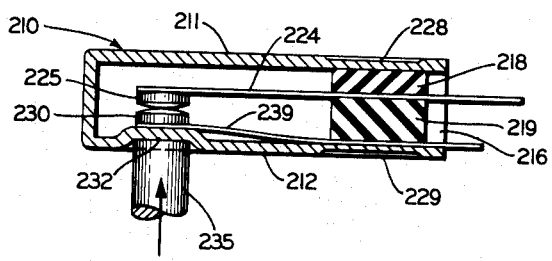
*Fig. 13*
INVENTOR.
*Glenn E. Wehl*
BY
*Fresse, Bishop, Johns & Schick*
ATTORNEYS

United States Patent Office 3,223,808
Patented Dec. 14, 1965

3,223,808
PRECALIBRATED THERMOSTATIC SWITCHES
Glenn E. Wehl, North Canton, Ohio, assignor to Portage Electric Products, Inc., North Canton, Ohio, a corporation of Ohio
Filed Sept. 25, 1963, Ser. No. 312,827
1 Claim. (Cl. 200—138)

This application is a continuation-in-part of my copending application Serial No. 201,388, filed June 11, 1962, and now abandoned.

My invention relates to improvements in thermostat switch construction and more specifically to thermostat switches of the type used for establishing and interrupting an electrical circuit therethrough subject to predetermined temperature variations. Even more specifically, my invention relates to thermostat switch construction of the foregoing general type and a unique method for manufacturing and calibrating the same.

Many prior forms of thermostat switch constructions have been provided in which opposed electrical contacts are formed controlled for establishing and interrupting an electrical circuit therethrough subject to temperature changes, by use of temperature sensitive bi-metal strips upon which one or both of the contacts are mounted.

Furthermore, the demand for these thermostat switches has increased greatly in the past few years and particularly those constructions which may be formed of minimum size and may be mass produced at a modest unit cost, suitable for use in relatively inexpensive high production electrical devices commonly used in the modern home.

Thus, to satisfy this want and need, such a thermostat switch construction must have a minimum material unit cost, and even more important, the fabrication, assembly, and calibration thereof must be as simple as possible in order to minimize labor time and costs. Although these thermostat switch constructions must necessarily be formed from relatively expensive materials in order to function properly, the several areas where costs can be reduced are in the assembly and calibration of these switches.

For instance, in most prior thermostat switch constructions, not only have the constructions been relatively complicated with a great number of parts requiring a difficult assembly in numerous stages, but these prior thermostat switch constructions have also required calibration after virtually the entire assembly, either by somehow attempting to bend the temperature sensitive bi-metal strips controlling the relative movement of the switch contacts, or by bending certain cross-sectional portions of the entire switch case to reposition the bi-metal strip or strips and thereby place the contacts in a particular relative position. Thus, cost savings can be made not only in simplifying the assembly of thermostat switches, but also by providing a unique and simplified calibration operation.

It is, therefore, a general object of the present invention to provide a thermostat switch construction and method which results in production cost savings in both assembly and calibration thereof.

It is a primary object of the present invention to provide a thermostat switch construction and method whereby the calibration operation, after substantially the complete assembly, is greatly simplified.

It is a further object of the present invention to provide a thermostat switch construction and method in which the various parts are greatly simplified, and the main assembly operation is relatively simple to accomplish with a maximum of accuracy.

It is still a further object of the present invention to provide a thermostat switch construction and method whereby the calibration operation constitutes merely a final forming operation, which does not require any complete reforming of the entire case structure, nor any attempt to bend or reposition the bi-metal strip member or members.

It is still a further object of the present invention to provide a thermostat switch construction and method in which the final calibration operation is greatly simplified, yet provides calibration of a maximum of accuracy.

Finally, it is an object of the present invention to provide a thermostat switch construction and method which accomplishes all of the foregoing objects in a simple and efficient manner, and at a minimum of both material and labor expense.

These and other objects are accomplished by the parts, constructions, arrangements, combinations, subcombinations and methods comprising the present invention, preferred embodiments of which—illustrative of the best modes in which applicant has contemplated applying the principles—are set forth in the following description and illustrated in the accompanying drawings, and which are particularly and distinctly pointed out and set forth in the appended claim forming a part hereof.

In general terms, the thermostat switch constructions comprising the present invention may be stated as including a tubular case, preferably formed of an electrical conducting material, such as brass or copper, and preferably having a closed end and an open end. Further, upper and lower rigid blocks, preferably insulating blocks, are positioned one over the other securely clamped by the case within the case open end, with bi-metal strip means being positioned clamped between the blocks and extending from these blocks generally into the inner confines of the case. Still further, first contact means is mounted on this bi-metal strip means at a location spaced a predetermined distance within the case from the blocks.

Additionally, in one form of the present invention, a second contact means is secured to a case wall and aligned for contact with the first contact means. In another form of the present invention, this second contact means may be mounted at one end of a mounting strip means, preferably of flexible metal and positioned lying along the case wall, so that the second contact means is again aligned for contact with the first contact means. In this second form, the other end of this mounting strip means spaced from the second contact means is preferably secured between said case wall and one of the rigid blocks so that these rigid blocks, in cooperation with the clamping of the case, not only clamp the bi-metal strip means, but also this mounting strip means.

In either form of mounting the second contact means, whether directly on the case wall or supported at the case wall by the mounting strip means, extruded means is formed on said case wall at said second contact means for positioning this second contact means relative to the first contact means and in cooperation with the bi-metal strip means to provide contact between said first and second contact means below a predetermined temperature, and movement of the first contact means away from the second contact means as controlled by the bi-metal means above this predetermined temperature. Where the second contact means is secured directly to the case wall, the extruded means is formed on the case wall around the second contact means, whereas in the second form, the extruded means is formed on the case wall at and behind the second contact means, forcing said second contact means into proper position relative to the first contact means.

Finally, electrical circuit means may be operably connected to the first and second contact means for completion of the circuit means when the contact means are in contact. In the first form of mounting the second contact means directly on the case wall, where the case is formed of brass or copper, the rigid blocks are formed of insulating material, the bi-metal strip means is formed of electrical conducting material, and the second contact means is mounted on the case wall in electrical conducting relationship, this electrical circuit may be formed through the case to the second contact means and through the bi-metal strip means to the first contact means. In the second form wherein the mounting of the second contact means is on the mounting strip means rather than directly on the case wall, and with the mounting strip means being formed of electrical conducting material, the electrical circuit may be established through the mounting strip means to the second contact means and through the bi-metal strip means to the first contact means, and this is regardless of whether or not the case is formed of an electrical conducting material.

The methods of the present invention involve both the forming and assembling of the thermostat switch construction and may be stated as including the steps of assembling the bi-metal strip means between the rigid or insulating blocks and clamping the blocks, preferably by deforming the case above and below the blocks, within an end of the case, with the bi-metal strip means tightly clamped between the blocks and extending into the case, and with the first contact means spaced from the blocks within the case. Also, the method includes the step of positioning the second contact means at a wall of the case within the case and aligned for contact with the first contact means. In one form, this positioning of the second contact means would be by securing the same directly to the case wall, and in a second form, would be the simultaneous clamping of mounting strip means upon which the second contact means is mounted between one of the blocks and the case wall at the same time these blocks are clamped by the case wall for clamping the bi-metal strip means therebetween.

Still further, the method includes the step of extruding a portion of the case wall adjacent the second contact means inwardly to locate the second contact means in a preselected position for contact with the first contact means below a predetermined temperature and movement of said first contact means away from the second contact means, as controlled by the bi-metal strip means, above this predetermined temperature. Where the second contact means is secured directly to the case wall, the extruding of the case wall will be around the second contact means, whereas in the second form, where the second contact means is mounted on the mounting strip means and against the case wall, the extruding will be on the case wall behind the second contact means.

This preselected positioning of the second contact means by extrusion of the case wall to physically move and position this second contact means is determined by the temperature characteristics of the bi-metal strip means and it is preferred, for maximum accuracy, to complete the assembly operations at room temperature, and then heat the construction to the predetermined temperature and, while maintaining this predetermined temperature, to perform the extruding of the case wall adjacent the second contact means to the point where the contacts have just made contact, thereby accomplishing exact calibration.

Finally, an electrical circuit is provided to the first and second contact means and through these contact means when said contact means are together below the predetermined temperature.

Figure 2:
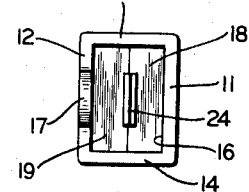
Figure 3:
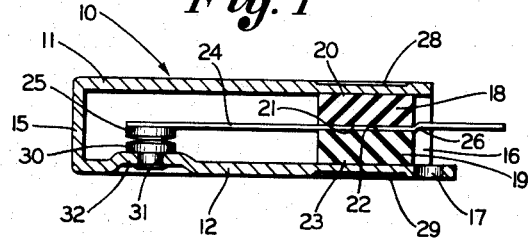
Figure 4:
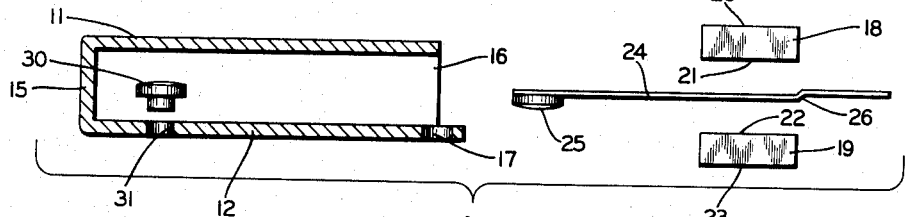
Figure 5:
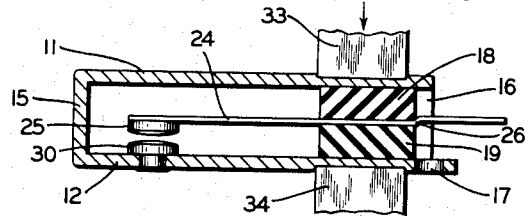
Figure 6:
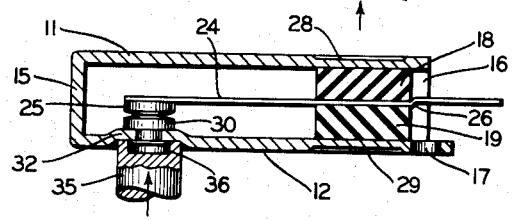
Figure 7:
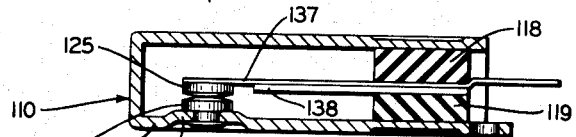

By way of example, embodiments of the thermostat switch construction and methods of the present invention are illustrated in the accompanying drawings forming a part hereof, wherein like numerals indicate similar parts throughout the several views, and in which:

FIG. 1 is a bottom plan view of a first embodiment of a thermostat switch construction incorporating the principles of the present invention;

FIG. 2, an end view of the switch construction of FIG. 1;

FIG. 3, a sectional view, part in elevation, looking in the direction of the arrows 3—3 in FIG. 1;

FIG. 4, an exploded view of the switch construction of FIG. 1 showing all of the parts thereof prior to assembly and with the switch case in cross section;

FIG. 5, a view similar to FIG. 3, but with the switch construction in the initial stages of assembly and prior to the final extrusion calibration step;

FIG. 6, a view similar to FIG. 3, illustrating the extrusion calibration step;

FIG. 7, a view similar to FIG. 3, but showing a slightly modified second embodiment form of the switch construction incorporating the principles of the present invention;

FIG. 8, a bottom plan view of a third embodiment of a thermostat switch construction incorporating the principles of the present invention;

FIG. 9, an end view of the switch construction of FIG. 8;

FIG. 10, a sectional view, part in elevation, looking in the direction of the arrows 10—10 in FIG. 8;

FIG. 11, an exploded view of the switch construction of FIG. 8 showing all of the parts thereof prior to assembly and with the switch case in cross-section;

FIG. 12, a view similar to FIG. 10, but with the switch construction in the initial stages of assembly and prior to the final extrusion calibration step; and FIG. 13, a view similar to FIG. 10, illustrating the extrusion calibration step.

Referring to FIGS. 1 through 4, the first embodiment of the thermostat switch construction illustrated, incorporating the principles of the present invention, includes a tubular case, generally indicated at 10, preferably formed rectangular in vertical cross-section, to thereby have the flat top wall 11, bottom wall 12, and side walls 13 and 14. Further, case 10 is preferably provided with a closed end 15 and an open end 16, with this case preferably being formed totally of an electrically conducting material, such as drawn brass or copper, and in such event, the bottom wall 12 may be formed with an electrical connector 17 adjacent the open end 16.

Upper and lower rigid blocks 18 and 19, preferably formed of insulating materials having relatively high temperature characteristics and a rigid final fabricated form, are positioned one over the other within the case open end 16. These blocks 18 and 19 are preferably formed perfectly rectangular so that all surfaces are either substantially parallel or perpendicular. Thus, the upper block 18 has the upper and lower surfaces 20 and 21, and the lower block 19 has the upper and lower surfaces 22 and 23, all of which are preferably parallel. Furthermore, when these blocks 18 and 19 are positioned within the case open end 16, the lower surface 21 of the upper block 18 will mate with the upper surface 22 of the lower block 19.

A bi-metal strip member 24 is positioned between the block opposed surfaces 21 and 22, with this strip member extending preferably outwardly of the case open end 16 between the block opposed surfaces, and from the blocks 18 and 19 into the inner confines of case 10 a predetermined distance, which is preferably spaced slightly from the case closed end 15, as shown. This bi-metal strip member 24 may be formed of the usual temperature sensitive materials for moving toward and away from the case bottom wall 12 subject to temperature variations. Furthermore, a contact 25, preferably formed of a silver alloy, is mounted on the end of the bi-metal strip member 24 spaced from the blocks 18 and 19 and within the case 10.

With the blocks 18 and 19 of substantially the same vertical thickness, the bi-metal strip member 24 will be positioned by these blocks extending substantially vertically midway between the case top and bottom walls 11 and 12, with contact 25 extending downwardly therefrom, but spaced above the case bottom wall 12. Also, it is preferred that the bi-metal strip member 24 will be positioned by the blocks 18 and 19 substantially horizontally midway between the case side walls 13 and 14.

For convenient assembly purposes, which will be hereinafter discussed in detail, the bi-metal strip member 24 is formed at the outer ends of the blocks 18 and 19, that is, those ends adjacent the case open end 16, with an upwardly angled engagement portion 26. Also, the materials forming the bi-metal strip member 24, when the blocks 18 and 19 are of electrical insulating material, are preferably electrically conducting, and the outer end of this strip member, outwardly of the case open end 16, may be formed with an electrical connector 27.

The case top and bottom walls 11 and 12 are formed with the depressions 28 and 29, respectively, overlying and underlying the blocks 18 and 19, thereby forcing the upper block downwardly and the lower block 19 upwardly to tightly abut the mating surfaces 21 and 22 thereof. This tightly grips the bi-metal strip member 24 therebetween and securely positions the bi-metal strip member for a predetermined extension into the inner confines of the case 10.

Finally, a mushroom-shaped contact 30, also preferably formed of a silver alloy, is positioned in an opening 31 formed in the case bottom wall 12, directly underlying and aligned with the contact 25 on the inner end of the bi-metal strip member 24. The lower end of contact 30 is formed spread slightly over the outer surface of the case bottom wall 12 to thereby securely position this contact in the case bottom wall extending into the inner confines of the case and in alignment with the contact 25.

Further, an annular upwardly extruded portion 32 is formed in the case bottom wall 12 surrounding the contact 30, thereby positioning this contact 30 in a predetermined vertical location relative to the contact 25 on the bi-metal strip member 24. The upward extent of this extruded portion 32 and, therefore, the final precalculated or predetermined vertical positioning of contact 30, is determined and perfectly related to the extension of the bi-metal strip member 24 from the blocks 18 and 19, the characteristics of this bi-metal strip, and the size and positioning of the contacts 25 and 30.

These various elements are precalculated, formed and positioned such that when this thermostat switch construction is in its final assembled form, as shown in FIG. 3, the total calibration operation is completed, and the contacts 25 and 30 will remain together in electrical transmitting abutment or making electrical contact therebetween up to a predetermined temperature, above which, due to the precalculated temperature characteristics of bi-metal strip member 24, this strip member will move the contact 25 upwardly away from the contact 30, thereby breaking electrical contact therebetween.

These necessary calculations for determining the extent of the vertical forming of the extruded portion 32 on the case bottom wall 12, choosing the particular material and extension of the bi-metal strip member 24, as well as the formation and positioning of the contacts 25 and 30, are usual calculations dependent on materials, sizes and temperature characteristics desired, and are clearly within the knowledge of one skilled in the art.

Furthermore, these thermostat switches, as is well known, may be formed to operate in the opposite manner described, that is, to interrupt an electrical circuit from a temperature decline, so that where the operation is described or defined in the specification or claim, it is also intended to cover and protect this reverse operation.

Thus, in the final use of the thermostat switch construction illustrated in FIGS. 1 through 4, it is merely necessary to connect an outside electrical circuit to the electrical connector 17 on case 10 and the electrical connector 27 on the bi-metal strip member 24, thus providing an electrical circuit through bi-metal strip member 24 to contact 25, from contact 25 to contact 30 when these contacts are together, and from contact 30 through the case 10.

Furthermore, this electrical circuit will be completed below the predetermined temperature at which the contacts 25 and 30 remain together, and will be broken or interrupted above this predetermined temperature when the bi-metal strip member 24 moves the contact 25 upwardly away from the contact 30.

The method of forming and assembling the first embodiment form of thermostat switch construction illustrated and according to the principles of the present invention, first comprises the forming of the case 10, after which the contact 30 is positioned in the opening 31 of the case bottom wall 12 and solidly secured to this case bottom wall by the spreading of the contact outer end as described, so that this contact 30 extends into the inner confines of case 10 spaced a predetermined distance from the case open end 16. At this point, the case bottom wall 12 around the contact 30 is substantially flat, as shown in FIG. 5.

Next, the upper and lower blocks 18 and 19 are formed of proper dimensions, and also the bi-metal strip member 24 is formed of the proper selected materials and is provided with the contact 25 mounted thereon, preferably in electrical contact therewith, at proper location and of proper size. The engagement portion 26 is formed on the bi-metal strip member 24 at the proper location so that with this engagement portion abutting the end of the upper block 18 during assembly, the extension of the bi-metal strip member from the blocks 18 and 19 will be the proper predetermined distance.

Next, the blocks 18 and 19 are assembled one above the other with the opposed surfaces 21 and 22 facing, and the bi-metal strip member 24 properly positioned therebetween, and these insulation blocks and the bi-metal strip member are inserted into the case open end 16 to the position shown in FIG. 5. At this time, the blocks 18 and 19, with the engagement portion 26 of the bi-metal strip member 24 adjacent the upper block 18, are inserted at the proper distance, so that the contact 25 on the bi-metal strip member 24 is properly aligned overlying the contact 30 on the case bottom wall 12.

The next assembly step, as shown in FIG. 5, is the forming of the depressions 28 and 29 on the case top and bottom walls 11 and 12 by usual die members 33 and 34, which compresses or clamps the case against the blocks 18 and 19, permanently positioning these blocks within the case open end 16 in predetermined location, and with the bi-metal strip member 24 clamped between and extending a predetermined distance therefrom. The formation of the depressions 28 and 29 is preferably accomplished so that the case top and bottom walls 11 and 12, the upper and lower surfaces 20 and 21 of block 18, and the upper and lower surfaces 22 and 23 of block 19 are all substantially parallel in final assembled form.

All of the foregoing assembly steps are preferably performed at room temperature. For maximum calibration accuracy, however, it is preferred to carry out the final assembly step, which is the forming of the extruded portion 32 in the case bottom wall 12, at the predetermined temperature above which it is desired to have the contacts 25 and 30 separate and below which it is desired to have these contacts together and making electrical contact therebetween.

Thus, in the final assembly step, it is preferred to form the extruded portion 32 in the case bottom wall 12, and this extruded portion is formed vertically upwardly by a usual die member 35 until the contact 30 on this case bottom wall is just touching and making electrical contact with the contact 25 on the bi-metal strip member 24. As shown in FIG. 6, die member 35 may have the usual relief 36 for clearing the lower end of contact 30 so as not to disturb the positioning of this contact within the opening 31 in the case bottom wall.

This last step or operation, since performed at the predetermined temperature described, perfectly calibrates the thermostat switch to break contact above this predetermined temperature and make contact below this predetermined temperature. Thus, this final forming or extrusion operation accomplishes exact calibration of the switch construction.

It is, of course, possible to perform this last extrusion step for forming the extruded portion 32 in the case bottom wall 12 at room temperature by precalculating the required vertical extent of this extruded portion, as matched with the particular size of the contacts 25 and 30, the particular bi-metal strip member 24, the extension and temperature characteristics of this bi-metal strip member, as well as the predetermined temperature at which it is desired for the separation of or electrical contact of the contacts 25 and 30. In many cases, this would be satisfactory, where maximum calibration accuracy is not required, but would demand the maintaining of close production tolerances.

The modified second embodiment form of the thermostat switch construction, shown in FIG. 7, is substantially identical to the first embodiment construction previously described, with the exception of the formation of the bi-metal strip member, which, in this case, is formed of an upper metal strip 137 of properly selected material, with the temperature sensitive bi-metal member 138 secured to the lower surface thereof for properly controlling movement of the metal strip member and consequently the contact 125 as required. Otherwise, the case 110, the contact 130 on the case bottom wall 112, the contact 125 on the metal strip 137, and the upper and lower rigid or insulation blocks 118 and 119 are substantially the same, with slight dimensional changes to compensate for the modified bi-metal strip member controlling the contact 125.

The important point is that this modified second embodiment form of the thermostat switch construction, with the bi-metal strip member alteration, and with the slight dimensional changes, is assembled in the same manner as the form previously described. Furthermore, the last assembly step is the formation of the upwardly extruded portion 132 in the case bottom wall 112 around the contact 130 secured stationary to this case bottom wall 112.

Also, this formation of the extruded portion 132 is again preferably performed at the predetermined temperature, although by proper calculation, could be performed at room temperature, thereby, in either case, resulting in the last extrusion step accomplishing calibration simply and efficiently.

The still further modified third embodiment form of the thermostat switch construction, shown in FIGS. 8, 9 and 10, and the preferred methods of assembling and calibrating this third embodiment form, shown in FIGS. 11, 12 and 13, are very similar to the first and second embodiment forms, shown in FIGS. 1 through 7, with the exception of the exact manner of mounting the second contact 230 and the exact manner of providing the electrical circuit to this second contact.

Thus, the tubular case, generally indicated at 210, is formed with the flat top wall 211 and bottom wall 212, and the upper and lower rigid insulating blocks 218 and 219 are positioned one over the other within the case open end 216. In this instance, the upper block 218 may be formed of less vertical dimensions than the lower block 219, as shown, in order to accommodate the different forms of mounting the second contact 230.

Still further, in this third embodiment form, the second contact 230, rather than being mounted directly secured to the case bottom wall 212, is mounted on the upper side of a preferably flexible and electrical conducting mounting strip member 239. This mounting strip member 239 is similar in size and extent to the bi-metal strip member 224 mounting the first contact 225, with the exception that this mounting strip member may be formed of slightly less total length so as to end short of the total extent of the bi-metal strip member 224 outward of the case open end 216, as shown.

Furthermore, the mounting strip 239 is positioned against the case bottom wall 212 with the second contact 230 extending upwardly therefrom and with this mounting strip member extending between the lower surface 223 of the lower block 219 and the case bottom wall 212. Thus, not only is the bi-metal strip member 224 secured in position so as to extend into the inner confines of case 210 by being clamped between the upper and lower blocks 218 and 219, but also the mounting strip member 239 is similarly positioned extending into the case 210 but abutting the case bottom wall 212 by being clamped between the lower block 219 and the case bottom wall. Again, the upper and lower blocks 218 and 219 are retained clamped in the case open end 216 by the formation of the depressions 228 and 229 on these walls, with the bi-metal strip member 224 clamped between these blocks, and the mounting strip member 239 clamped between the lower block 219 and the case bottom wall 212.

Since, in this third embodiment form, the second contact 230 is mounted on the mounting strip member 239 merely lying against the case bottom wall 212, the upwardly extruded portion 232 is merely formed in the case bottom wall 212 adjacent and upwardly against the second contact 230, to thereby force the second contact upwardly into proper calibrated position relative to the first contact 225 and the bi-metal strip member 224. Also, with the mounting strip member 239 formed of electrical conducting material, an electrical connector 240 may be formed on the mounting strip member 239 outward of the blocks 218 and 219 and preferably outward of the case open end 216, as shown.

Thus, in the final use of the thermostat switch construction of this third embodiment form shown in FIGS. 8, 9 and 10, an outside electrical circuit may be connected to the electrical connector 227 on the bi-metal strip member 224 and the electrical connector 240 on the mounting strip member 239, thereby providing an electrical circuit through the bi-metal strip member 224 to the first contact 225, from contact 225 to contact 230 when these contacts are together, and from contact 230 through the mounting strip member 239. Furthermore, this electrical circuit will be completed below the predetermined temperature at which the contacts 225 and 230 remain together, and will be broken or interrupted above this predetermined temperature when the bi-metal strip member 224 moves the contact 225 upwardly away from the contact 230.

The method of forming and assembling the third embodiment form of thermostat switch construction is in general principle very similar to the methods of forming the first and second embodiments, with the only changes being those necessitated by the slightly different manner of mounting the second contact 230 on the mounting strip member 239 positioned and clamped by the lower block 219 and case bottom wall 212. The various parts are illustrated in FIG. 11 and the method includes the forming of the case 210, the bi-metal strip member 224 with the first contact 225 mounted thereon, and the upper and lower blocks 218 and 219.

The first assembly step is to position the upper and lower blocks 218 and 219 in the case open end 216, with the bi-metal strip member 224 between these blocks extending into the inner confines of the case 210 and the mounting strip member 239 positioned between the lower block 219 and the case bottom wall 212, likewise extending into the inner confines of the case 210. As shown in FIG. 12, in this position, the first contact 225 mounted on the inner end of the bi-metal strip member 224 overlies and is vertically aligned with the second contact 230 mounted on the inner end of the mounting strip member 239, and at this stage, the mounting strip member 239 preferably lies along and abutting the case bottom wall 212, thereby preferably positioning the second contact 230 spaced below the first contact 225.

As previously, the next assembly step, as shown in FIG. 12, is the forming of the depressions 228 and 229 on the case top and bottom walls 211 and 212 by usual die members 233 and 234 to compress or clamp the case against the blocks 218 and 219, permanently positioning these blocks within the case open end 216 with the bi-metal strip member 224 clamped between these blocks, the mounting strip 239 clamped between the lower block 219 and the case bottom wall 212, and with both strip members extending the proper predetermined distance into the case 210. Again, the foregoing assembly steps are preferably performed at room temperature, whereas the final assembly step which includes the calibration of the thermostat switch construction, is preferably performed at the predetermined temperature above which it is desired to have the contacts 225 and 230 separate, and below which it is desired to have these contacts together and making electrical contact therebetween.

This last assembly step performed at the predetermined temperature is accomplished merely by forming the extruded portion 232 vertically upwardly in the case bottom wall 212 by a usual die member 235 so that this extruded portion is formed against the second contact 230, thereby forcing this second contact vertically upwardly. As before, the formation of the extruded portion 232 is continued vertically upwardly until the second contact 230 is just touching and making electrical contact with the first contact 225 on the bi-metal strip member 224, as shown in FIG. 13, to thereby perfectly calibrate the thermostat switch to break contact above this predetermined temperature and make contact below this predetermined temperature.

Thus, according to the principles of the present invention, thermostat switch construction and method are provided in which the over-all construction is simplified from previous constructions, while at the same time, by proper formation of the various elements and proper selection of the materials thereof, the last assembly step simply and efficiently accomplishes the complete calibration of the switch construction.

Furthermore, it is unnecessary to attempt to calibrate the switch construction by attempting to properly bend the bi-metal strip means, or to attempt to bend the entire cross-section of the case. As a consequence, savings are provided both in material and labor costs.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the improved construction and methods illustrated and described herein are by way of example and the scope of the present invention is not limited to the exact details of construction and methods shown.

Having now described the invention, construction, methods, operation and use of the preferred embodiments thereof, and the advantageous new and useful results obtained thereby, the new and useful construction and method, and reasonable mechanical equivalents thereof obvious to those skilled in the art are set forth in the appended claim.

I claim:

Thermostat switch construction including a tubular generally rectangular cross-section case of deformable metal having at least one open end, the case having spaced upper and lower walls and spaced side walls and at least a relatively flat inner surface on the lower wall, upper and lower rigid positioning blocks at and within the case open end between the case upper and lower walls, the rigidity of the positioning blocks providing said blocks substantially nondeformable, the lower positioning block having a substantially flat lower surface, upper and lower flexible substantially flat contact strip means having forward and rearward end portions, at least the upper contact strip means being bi-metallic and movable upwardly and downwardly subject to temperature variations, the forward end portion of the upper contact strip means having contact means thereon arranged for downward electrical contact and the forward end portion of the lower contact strip means having contact means thereon arranged for upward electrical contact, the rearward end portion of the upper contact strip means extending rearwardly between the upper and lower positioning blocks, the forward end portion of the upper contact strip means extending forwardly within the case spaced from the case side walls and spaced downwardly from the case upper wall and upwardly from the case lower wall in cantilever fashion with the contact means thereon spaced forwardly from the positioning block means, the rearward end portion of the lower contact strip means extending rearwardly between the flat lower surface of the lower positioning block and the lower case wall, the forward end of the lower contact strip means extending forwardly within the case flatwise against the inner surface on the case lower wall with the contact means thereon spaced forwardly from the positioning block means and being downwardly aligned with the contact means of the upper contact strip means, at least one of the case upper and lower walls adjacent the positioning blocks being deformed against said blocks clamping said blocks and the upper and lower contact strip means in the respective positions, and the case lower wall being deformed upwardly against the forward end portion of the lower contact strip means forming a permanent upwardly extending extruded portion means flexing the forward end portion of the lower contact strip means permanently upwardly and placing the contact means of the lower contact strip means in a predetermined permanent location relative to the contact means on the upper contact strip means for making and breaking electrical connection between the contact means of the upper and lower contact strip means under preselected temperature variations.

References Cited by the Examiner

UNITED STATES PATENTS

| | | | |
|---|---|---|---|
| 1,368,412 | 2/1921 | Rohne | 200—138 |
| 1,901,775 | 3/1933 | Reichold | 200—138 |
| 2,497,397 | 2/1950 | Dales | 200—138 |
| 2,627,003 | 1/1953 | Porter | 200—138 |
| 2,675,445 | 4/1954 | Youhouse | 200—138 |
| 3,012,122 | 12/1961 | Clelland | 200—138 |
| 3,021,405 | 2/1962 | Epstein | 200—138 |
| 3,148,258 | 9/1964 | Dales | 200—138 |

BERNARD A. GILHEANY, *Primary Examiner.*

E. JAMES SAX, LAWRENCE A. WRIGHT, *Examiners.*